UNITED STATES PATENT OFFICE.

CHARLES MYERS, OF AKRON, OHIO, ASSIGNOR, BY DIRECT AND MESNE ASSIGNMENTS, TO MICHAEL J. MURPHY, OF SAME PLACE, AND H. ROSENBAUM, OF CINCINNATI, OHIO.

CEMENT.

SPECIFICATION forming part of Letters Patent No. 624,521, dated May 9, 1899.

Application filed July 15, 1898. Serial No. 686,049. (No specimens.)

*To all whom it may concern:*

Be it known that I, CHARLES MYERS, of Akron, Summit county, and State of Ohio, have invented certain new and useful Improvements in Cements; and I do hereby declare the following to be a full, clear, and exact description of the invention, such as will enable others skilled in the art to which it pertains to make and use the same.

My invention relates to an improved cement adapted to adhere or unite, and hence attach other bodies or substances to a glassy or vitrified slab or plate or to a brick or block of burnt clay or other earthy material or composition.

The cement or compound comprises, essentially, the following ingredients: glue, corrosive sublimate, and strychnine. These ingredients are suitably compounded in suitable proportions. The glue is rendered liquid by the addition of water and the application of heat, and the corrosive sublimate and the strychnine are mechanically mixed with the liquid glue in any approved manner. The quantities of corrosive sublimate and strychnine used are immaterial; but I have found that about five grains of the corrosive sublimate and three grains of the strychnine to a quart of the liquid glue afford satisfactory results. I have found also that the use of considerably more corrosive sublimate than strychnine—for instance, about five grains of the former to three grains of the latter—gives the best results.

The cement is applied to the vitreous or other surface by means of a brush or in any other approved manner.

What I claim is—

1. The herein-described cement or compound comprising, essentially, glue, corrosive sublimate and strychnine.

2. The herein-described cement or compound consisting of glue, corrosive sublimate, and strychnine, and containing comparatively small quantities of the two last-mentioned ingredients.

3. The compound resulting from the mixture of corrosive sublimate and strychnine with liquid glue in approximately the proportions specified.

4. A glue compound having, as essential ingredients, corrosive sublimate and strychnine.

Signed by me at Cleveland, Ohio, this 21st day of June, 1898.

CHARLES MYERS.

Witnesses:
C. H. DORER,
ANNA H. PARRATT.